United States Patent
Mäkynen et al.

(10) Patent No.: US 11,343,319 B2
(45) Date of Patent: May 24, 2022

(54) METHOD AND A SYSTEM FOR USER AUTHENTICATION IN AN OFFLINE MOBILE CALIBRATION OR CHECKLIST PERFORMING DEVICE

(71) Applicant: Beamex Oy Ab, Pietarsaari (FI)

(72) Inventors: Antti Mäkynen, Pietarsaari (FI); Mathias Ray, Pietarsaari (FI); Marko Stenbacka, Pietarsaari (FI); Kennet Riska, Pietarsaari (FI)

(73) Assignee: Beamex Oy Ab, Pietarsaari (FI)

( * ) Notice: Subject to any disclaimer, the term of this patent is extended or adjusted under 35 U.S.C. 154(b) by 0 days.

(21) Appl. No.: 16/765,501

(22) PCT Filed: Nov. 26, 2018

(86) PCT No.: PCT/FI2018/050856
§ 371 (c)(1),
(2) Date: May 20, 2020

(87) PCT Pub. No.: WO2019/106232
PCT Pub. Date: Jun. 6, 2019

(65) Prior Publication Data
US 2020/0314185 A1    Oct. 1, 2020

(30) Foreign Application Priority Data
Nov. 28, 2017 (FI) .................... 20176067

(51) Int. Cl.
*G05B 19/401* (2006.01)
*H04L 67/125* (2022.01)
(Continued)

(52) U.S. Cl.
CPC .......... *H04L 67/125* (2013.01); *G05B 19/401* (2013.01); *H04L 63/083* (2013.01); *H04W 4/38* (2018.02)

(58) Field of Classification Search
CPC ..... H04L 67/125; H04L 63/083; H04L 67/32; H04L 67/12; H04L 63/0838;
(Continued)

(56) References Cited

U.S. PATENT DOCUMENTS

| 10,257,179 B1* | 4/2019 | Saylor ..................... H04L 63/08 |
| 2002/0199123 A1* | 12/2002 | McIntyre .............. H04L 63/104 726/3 |

(Continued)

FOREIGN PATENT DOCUMENTS

| FI | 124530 B | 9/2014 |
| FI | 124661 B | 11/2014 |

(Continued)

OTHER PUBLICATIONS

APE Software Inc.: "APE Software Tools for Management Systems Calibration Control Manual, Calibration Management Software", Feb. 24, 2017, XP055557313, URL:https://www.apesoftware.com/calibration-control/help/calibration-control-manual [retrieved on Feb. 15, 2019], pp. 23-29, 216-230.

*Primary Examiner* — Aftab N. Khan
(74) *Attorney, Agent, or Firm* — Thomas | Horstemeyer, LLP

(57) ABSTRACT

The present invention discloses a method and a system for user authentication in an offline mobile calibration or checklist performing device. At first, the work is assigned online in a Calibration Management Software (CMS), where the relevant data is selected and sent to a mobile device. In the field environment as offline, the mobile device requests user credentials from the user, and if valid, the user is able to perform the assigned task. With each obtained result, credentials are asked for saving the results into the mobile device. When the user returns from the field, he/she connects
(Continued)

the mobile device with the CMS, and transfers the obtained work data from the mobile device to the CMS.

13 Claims, 4 Drawing Sheets

(51) Int. Cl.
    *H04W 12/06*     (2021.01)
    *H04L 9/32*     (2006.01)
    *H04W 4/38*     (2018.01)
    *H04L 29/06*     (2006.01)

(58) Field of Classification Search
    CPC ........ H04L 9/3226; H04W 4/38; H04W 4/70; H04W 12/06; G05B 19/401; G06F 21/31
    See application file for complete search history.

(56) References Cited

U.S. PATENT DOCUMENTS

| | | | |
|---|---|---|---|
| 2007/0234042 A1* | 10/2007 | Gantman | H04L 9/3226 |
| | | | 713/156 |
| 2014/0114600 A1* | 4/2014 | Roth | G01K 15/005 |
| | | | 702/99 |
| 2014/0189520 A1 | 7/2014 | Crepps et al. | |
| 2016/0314303 A1* | 10/2016 | Johns | G06F 21/6209 |
| 2016/0323270 A1* | 11/2016 | Anand | H04L 63/083 |
| 2019/0149545 A1* | 5/2019 | Arora | H04L 9/3271 |
| | | | 726/7 |
| 2020/0028684 A1* | 1/2020 | Mars | H04B 10/1149 |
| 2021/0158814 A1* | 5/2021 | Hussain | G06F 3/167 |

FOREIGN PATENT DOCUMENTS

| | | |
|---|---|---|
| GB | 2513709 A | 11/2014 |
| WO | 2016/094946 A1 | 6/2016 |

\* cited by examiner

METHOD AND A SYSTEM FOR USER AUTHENTICATION IN AN OFFLINE MOBILE CALIBRATION OR CHECKLIST PERFORMING DEVICE

PRIORITY

This application is a U.S. national application of the international application number PCT/FI2018/050856 filed on Nov. 26, 2018, which claims priority of Finnish application FI20176067 filed on Nov. 28, 2017, the contents of all of which are incorporated herein by reference.

FIELD OF THE INVENTION

The present invention relates to calibration devices of manufacturing, automation or measurement lines, where the calibrators are used as field calibrators. Especially, the present invention relates to authenticating procedures of the calibrator device users in the field.

BACKGROUND OF THE INVENTION

Calibrators are devices which are used to detect inaccuracies in measurement devices and circuits in various manufacturing, automation, measurement, testing or other kinds of environments comprising e.g. electrical, thermodynamical, or pressure-related parameters. The calibrator supplies a reference input, which is used to make a comparison, i.e. to check the measured parameter output in both the tested device and in the calibrator. Measurement errors can thus be tracked and corrected if needed.

Finnish patent no. 124530 describes a process calibrator, which acts as a fieldbus communicator. It has support for several different fieldbus protocols. Finnish patent no. 124661 describes a process calibrator with a user interface where the device guides the user to select appropriate connection places for the used wires. It illustrates the connection locations on the user interface (i.e. screen) similarly as they appear on the real calibrator frontside.

WO 2016/094946 ("Arnott") discloses calibration of a sensor of a building using a mobile computing device, a computer system and an associated calibration sensor device. In its 9th embodiment in par. [0029] of Arnott it is mentioned that when the mobile computing device is in an online mode, there is a validation routine where a sensor identification, a user identification and a calibration check is performed. When the measurement is performed in an offline mode, the measured parameters seem to be recorded temporarily in the mobile computing system. When the mobile computing device is back in the online status, it can communicate with the server system and transfer (i.e. sync) the measurement data to the server system. No password inputting is mentioned anywhere in the description of Arnott.

FIG. 1 illustrates the current prior art solution used in the calibration products of the Applicant; Beamex Oy Ab. A Calibration Management Software (CMS) is used to manage a plant's calibration operations and data as well. A user can access the CMS by logging in the system and authenticating him/herself by a user ID and a correct password. It can be concluded that the CMS has formed a closed system having an online connection and proper authentication tools, but the mobile devices in the field have formed an open system with no online connection and with no proper authentication tools for their users. Data transfer from the mobile devices to the CMS after the calibration operations has had to be done afterwards through separate data transfer step between the CMS and the external mobile device, leading to complex procedures and delays as well, and of course the data transfer will this way remain insecure.

The problem in the prior art is thus that while the system access to a Calibration Management Software (CMS) has been controlled by user authentication procedure (requiring user ID and password), but there have not been any user authentication capabilities on offline mobile devices used in the field environment. Thus, the data safety associated with the calibration devices and the calibration itself has been endangered.

SUMMARY OF THE INVENTION

The present invention discloses a user authentication method in an offline device, where the offline device is configured to be used in calibration activities in the field. The inventive idea also comprises a corresponding system for user authentication, comprising an offline device.

The present invention as a summary can be disclosed as follows. A user accesses a Calibration Management Software (CMS), which is used to manage a plant's calibration operations and data. When he/she logs into the CMS, he/she needs to authenticate him/herself to gain access to the system. The authentication is configured so in one embodiment that the user can use his Windows login credentials (Active Directory). With user credentials, we mean login information comprising a username and a password. This user can be defined by the CMS system administrator to have a permission to use handheld offline devices, which communicate with the CMS system. The handheld offline device can be either a documenting calibrator or a tablet application. When going to the field with a handheld offline device, the user's credentials cannot be verified against the Active Directory because it requires an online connection. Due to this limitation, the user has had to provide a separate "Mobile Device password" in the CMS. After logging into the CMS, the user locates one or more instruments which he needs to calibrate and sends relevant information of the calibration (basically calibration instructions) to the handheld offline device, which can communicate with the CMS. Additional data is transferred to the offline device at the same time; i.e. to all users that have been given the permission to use the handheld offline devices who have a valid "Mobile Device Password". After sending the data to the handheld offline device, the user logs out of the CMS, takes the handheld offline device with him/her and goes to the field (offline) to the instrument which needs calibration. In the field, the user starts the handheld device or a calibration app in a smart device. The device requests for a login. The user types the same user ID as he/she did when accessing the CMS, and the "Mobile Device Password". Only after providing his/her credentials, the user is able to access the information that was sent to the handheld offline device and he/she is now able to start the calibration work. The user performs the calibration and when saving the data, he/she "signs" the results by authenticating him/herself once more, but this time the user only needs to provide the password, as he/she is already logged in to the offline device.

The calibration activities comprise also any direct measurement activity or a checklist observation activity, therefore the phrase "calibration" is interpreted in this text very broadly.

In other words, the present invention discloses a method for user authentication in an offline mobile calibration or checklist performing device. The method is characterized in that the method comprises the steps of:

assigning a calibration or checklist performing task in Calibration Management Software (CMS) server where the assigning is performed by a first user logged validly in the CMS server selecting and sending data relevant to the assigned task from the CMS server to a mobile calibration or checklist performing device in online state requesting mobile user credentials from a second user in the field with the mobile calibration or checklist performing device in offline state before the calibration or checklist performing task can be seen or selected performing the calibration or the checklist tasks with the mobile calibration or checklist performing device in offline state in the field saving the results to the mobile calibration or checklist performing device in offline state, where with each result saving, mobile user credentials are requested from the second user, and after a completed task, and after connecting the mobile calibration or checklist performing device online to the CMS server with a valid log-in information transferring the results of a completed task from the connected online mobile calibration or checklist performing device to the CMS server.

In an embodiment of the method according to the present invention, the assigned task comprises one or more calibration or checklist performing sub-tasks.

In an embodiment of the method according to the present invention, the mobile calibration or checklist performing device is a dedicated field calibrator, or a smart device comprising a suitable application.

In an embodiment of the method according to the present invention, the first user and the second user are the same user performing the field calibration task or checklist performing task.

In an embodiment of the method according to the present invention, all authorized field user IDs and passwords are stored in the CMS server.

In an embodiment of the method according to the present invention, an auxiliary group of supervising users is defined in the CMS server, which is given a special permission for all or part of the information in the mobile calibration or checklist performing device in offline state.

In an embodiment of the method according to the present invention, the data relevant to the assigned task comprises selected instruments and calibration instructions for the selected instruments, a list of references if needed, and a list of mobile users together with their encrypted mobile passwords.

In an embodiment of the method according to the present invention, the calibration or checklist performing task is performed in the field with no network connection possibilities during the performance of the task.

According to a second aspect of the invention, a system for user authentication in an offline mobile calibration or checklist performing device is presented. The system is characterized in that it comprises a controller configured to assign a calibration or checklist performing task in Calibration Management Software (CMS) server where the assigning is performed by a first user logged validly in the CMS server select and send data relevant to the assigned task from the CMS server to a mobile calibration or checklist performing device in online state request mobile user credentials from a second user in the field with the mobile calibration or checklist performing device in offline state before the calibration or checklist performing task can be seen or selected perform the calibration or the checklist tasks with the mobile calibration or checklist performing device in offline state in the field save the results to the mobile calibration or checklist performing device in offline state, where with each result saving, mobile user credentials are requested from the second user, and after a completed task, and after connecting the mobile calibration or checklist performing device online to the CMS server with a valid log-in information transfer the results of a completed task from the connected online mobile calibration or checklist performing device to the CMS server.

In an embodiment of the system according to the present invention, the assigned task comprises one or more calibration or checklist performing sub-tasks.

In an embodiment of the system according to the present invention, the mobile calibration or checklist performing device is a dedicated field calibrator, or a smart device comprising a suitable application.

In an embodiment of the system according to the present invention, the first user and the second user are the same user performing the field calibration task or checklist performing task.

In an embodiment of the system according to the present invention, all authorized field user IDs and passwords are stored in the CMS server.

In an embodiment of the system according to the present invention, an auxiliary group of supervising users is defined in the CMS server, which is given a special permission for all or part of the information in the mobile calibration or checklist performing device in offline state.

In an embodiment of the system according to the present invention, the data relevant to the assigned task comprises selected instruments and calibration instructions for the selected instruments, a list of references if needed, and a list of mobile users together with their encrypted mobile passwords.

DETAILED DESCRIPTION OF THE INVENTION

Manufacturing, automation or measurement lines in e.g. plants are environments with lots of process steps, involving physical and environmental parameters, input/output parameters and dynamic environment according to the application or solution applied in the plant. Process controlling in a correct way requires the various electronic components, elements and measurement devices to work in a correct way, and for ensuring this, calibration of the devices is required at certain instances of the process. At least the start of the process is a crucial moment, but the drift in the operation of the electric devices may result in a need of calibration for a given or previously named devices.

A Calibration Management Software (CMS) is a piece of software usually implemented in a control room server, or an external server accessible from the control room, and the CMS is able to store all the system configurations, and all user data, all instrument data and also the required reference data applied in the calibration itself.

Figure 1:
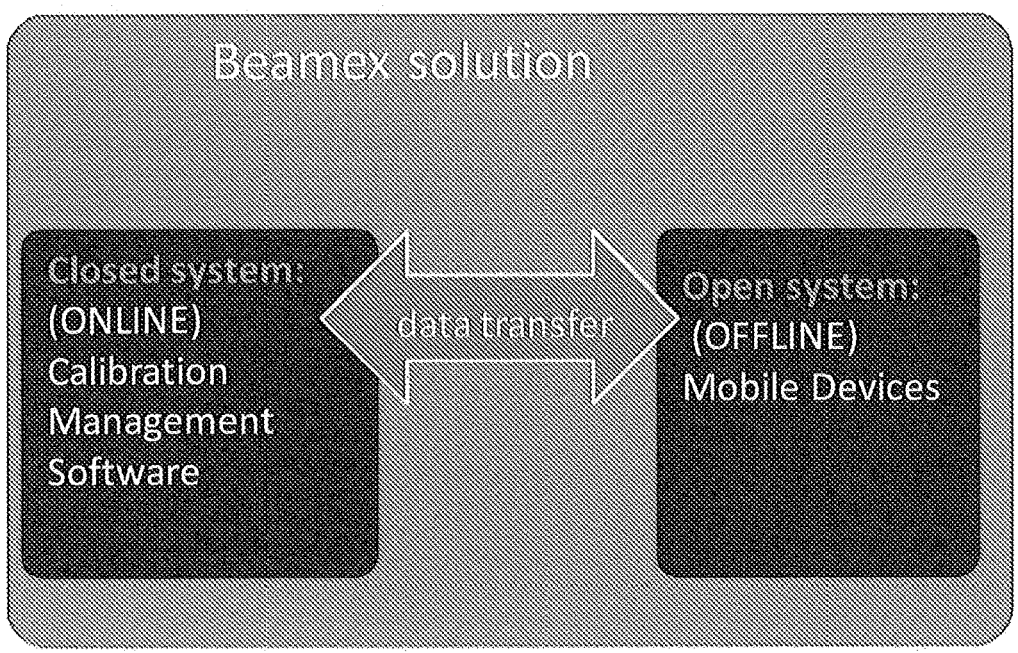
FIG. 1 illustrates the prior art situation with the online Calibration Management Software and the offline Mobile Devices.
Figure 2:
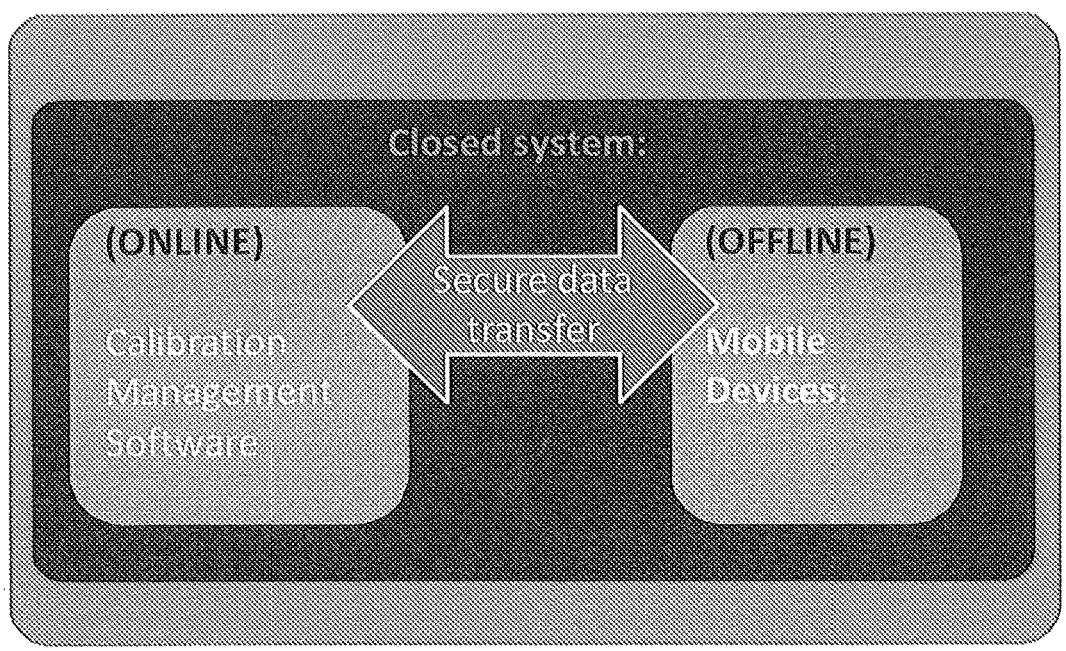
FIG. 2 illustrates a solution according to an embodiment of the present invention, enabling secure data transfer between the CMS and the Mobile Device.

The starting situation in the present invention is illustrated in FIG. 2. The Calibration Management Software (CMS) has an online network connection and it forms a closed system. It is desired that mobile devices comprising field calibrators which are used by the calibrating personnel, are also part of the closed and secure system. Therefore, a secure data transfer is required between the online CMS system and the offline mobile device performing the calibration in the field. The user authentication brings all the mobile devices as part of the closed, secure system with safe data transmission. The transmitted data between the CMS and the mobile device is not directly trackable or readable by an intermediate human intervener, and this is achieved through a dedicated communication protocol developed by the Applicant of the present invention, resulting in the transferred data not being in human readable format. The CMS acts as the master system where user data, instrument data and reference data and other relevant parameter data together with the system configuration data are stored and maintained. The CMS in the present invention is configured to require the user to login to an offline mobile device and enter their ID credentials when saving a calibration result. These details are covered later. The closed and secure calibration enabling system is the main focus of the algorithm and the system according to the present invention.

In an embodiment of the invention, the desired users listed already as CMS users can be given a permission to use a mobile device (i.e. a calibrator). Alternatively, all the CMS users can be given the mobile device use permission. The permission is created through user credentials, i.e. giving a user ID and a mobile device password for each dedicated user. The mobile device user IDs and mobile device passwords can be maintained and updated in a CMS database. The dedicated user has naturally a possibility to change his/her password, after providing the current password for authentication safety.

In an embodiment of the invention, the user credential list can be saved in the mobile device. The user credential list can be updated every time when there is communication between the CMS and the mobile device. This credential list update requires that a valid user with required permissions has logged onto the CMS. Only then is the credentials list on the mobile device synchronized.

In an embodiment of the invention, the login is required in a dedicated workstation. The dedicated workstation can be a portable field calibrator. The login is required also when a user starts a mobile application with a smart device, where the application is suitable for accessing and performing at least one measurement or calibration task in the field environment. In other words, the mobile device can be a smart device with an appropriate app, or a dedicated piece of apparatus usable in the field environment (such as e.g. a field calibrator).

Mobile device passwords can be set to require various criteria: such as a length requirement, complexity requirement, a need to change the password with a defined time period, and possible symbols available for the password. An account may be locked after a predefined number of login attempts have been tried to a single account (e.g. three attempts). In an embodiment, a locked user account can be reactivated by synchronizing the mobile device with the CMS.

A mobile user can have additional roles defined in the CMS, i.e. mobile supervisor, which gives these users additional permissions for part of the information in the mobile device or dedicated apparatus. The part of the accessed information may comprise general or regional settings, date and time information and language settings. The situation can be compared to IT personnel in a company who have administrational access to computers of the personnel. Of course, it can be defined that the supervising users have access to all settings information as well as to all saved measurement/calibration data within the calibrator. This can be defined in the CMS.

The main security issue is that when the user is saving an obtained calibration result to the mobile device, the mobile device asks for the valid mobile user credentials before the saving of the data is made. Therefore, in a preferred embodiment, the user is required to enter the login credentials, when switching-on or starting the calibrating functionality of the mobile device, and furthermore, when saving the obtained results to the mobile device.

Figure 3:
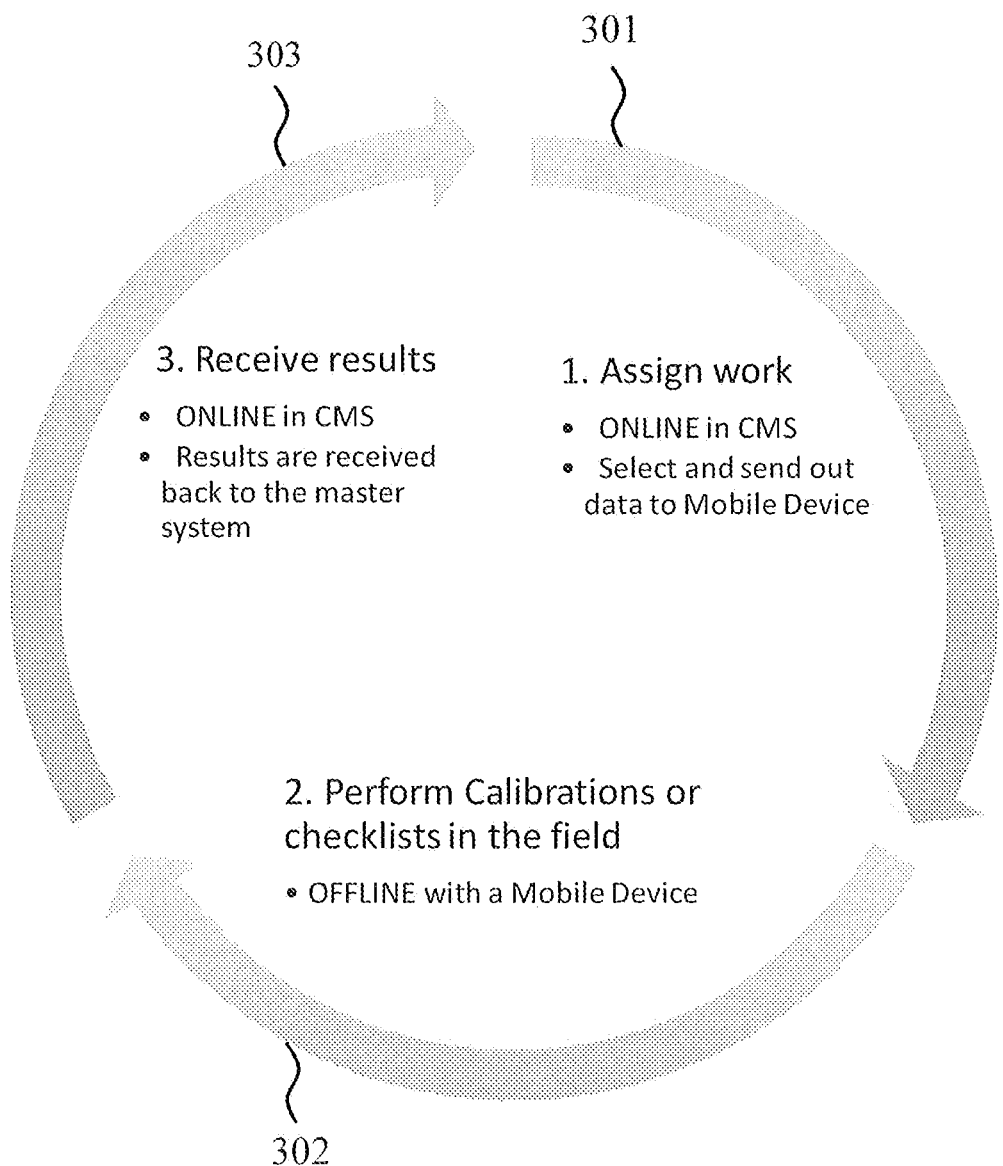
FIG. 3 illustrates a typical high-level workflow of a calibration process or of a checklist execution in an embodiment of the invention.

We next refer to a diagram of FIG. 3 illustrating a typical high-level workflow of a calibration process or of a checklist execution.

The work begins in the Calibration Management Software (CMS). The management of the instruments, users and calibration procedures is done in the CMS, which has an online connection to CMS database. The work is assigned 301 and sent from the CMS to a Mobile Device in step 1.

The actual calibrations may sometimes be needed to be done e.g. on premises of a store or more conventionally, in a factory environment, where it might not be possible to have an online connection. This is the reason, why the calibration work or the checklist examining work is often performed 302 with offline devices in the field (step 2).

After the calibration or checklist work has been done, the results are brought back 303 to the CMS database (step 3).

By configuring the system in a certain way, it is possible to achieve what is presented in the following paragraph. This is not a standard functionality, but it requires additional settings and configuration.

Figure 4:
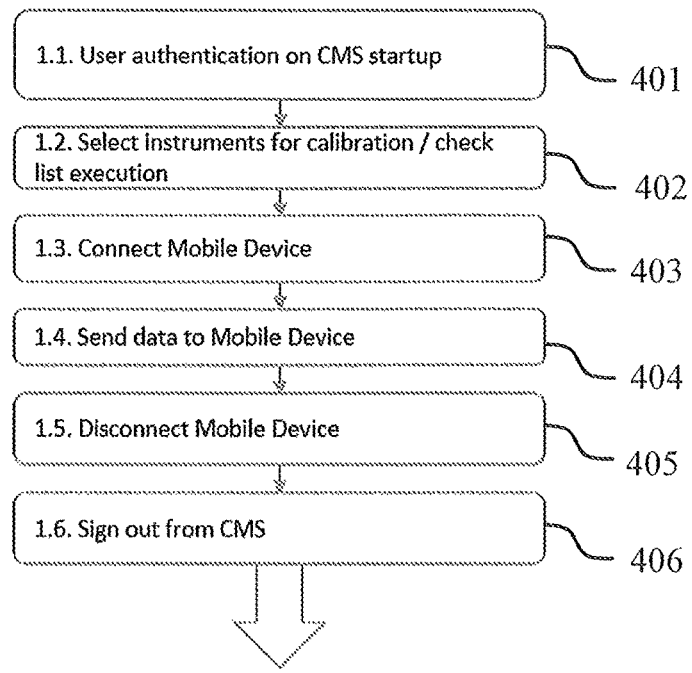
FIG. 4 illustrates the Assign work steps in the CMS online.
Figure 5:
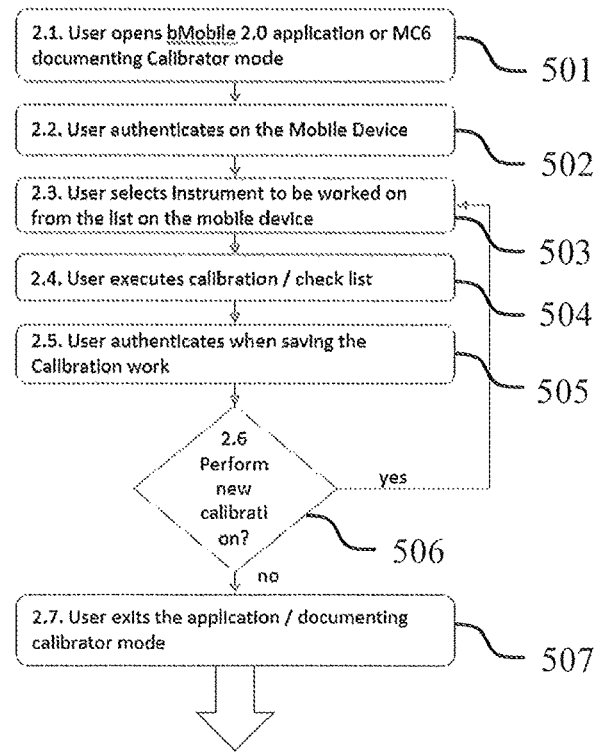
FIG. 5 illustrates the Perform calibration/check list execution steps offline.
Figure 6:
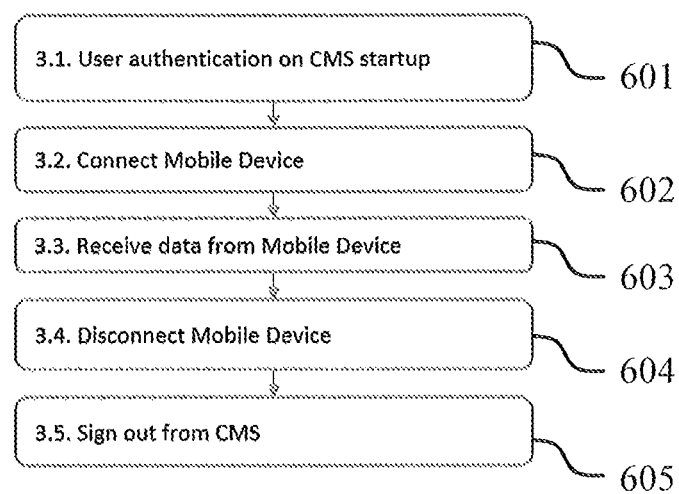
FIG. 6 illustrates the Receive results steps in the CMS online.

The following FIGS. 4-6 present the three steps from FIG. 3 in more detail and show, how users authenticate themselves, when they are offline.

Discussing the background information needed in the system, the user, instrument and reference data, and the system configurations are maintained in the CMS. A CMS user can also be assigned as a mobile device user. A mobile device user can also have an additional supervisor role (discussed earlier). Usually, the CMS user ID is also used as the mobile device user ID.

Regarding general operational principles, mobile device users must provide a mobile password for themselves in the CMS if the master system has been configured to do so. As disclosed before, the CMS has configurable rules on the requirements for mobile passwords, comprising complexity, length, and validity etc. of the password. The CMS system controls when user authentication on mobile devices is required. Generally speaking, the user authentication on mobile devices is required when starting up the application or device, and when saving a newly obtained result (as disclosed earlier). Still, user authentication may also be required in other phases during the calibration or during the checklist execution, such as e.g. allowing only users with a supervisor role to delete results from the mobile device.

FIG. 4 shows the first step of FIG. 3 in more detail, with six sub-steps.

The first step 301 of FIG. 3 is here named as "Assign work in the Calibration Management Software, CMS (online)".

At the first step 401 of FIG. 4, in 1.1, the user provides his/her CMS user ID and the corresponding CMS password. When valid credentials are provided, the user is allowed to access the CMS.

At the second step 402, in 1.2, the user locates, i.e. names, the instruments which are going to be worked on in the calibration or in the checklist execution.

At the third step 403, in 1.3, the user connects a supported mobile device to the CMS. The connection can be done via a USB cable or via Wi-Fi or Ethernet connection depending on the mobile device.

At the fourth step 404, in 1.4, the user has selected the instruments and sends their data to a mobile device. When the instrument data is being sent from the CMS to a mobile device, a copy of following data is sent to the mobile device:
  Selected instruments and instructions, how to calibrate them
  A list of references (in some cases)
  A list of mobile users together with their encrypted mobile passwords. A mobile user is sent to the mobile device only if he/she has provided a valid mobile password in the CMS.

At the fifth step 405, in 1.5, the user disconnects the mobile device from the CMS.

At the sixth and final step 406 in the "Assign work" task, in 1.6, the user signs him/herself out from the CMS system.

FIG. 5 illustrates the second high-level step 302 of FIG. 3 as a more detailed flow chart. This high-level step 302 is here named as "Perform calibration/check list execution (offline)".

At the first step 501 of FIG. 5, in 2.1, the user starts a suitable mobile application (i.e. app) in a smart device or opens up the documenting calibrator mode in the used dedicated calibrating device (i.e. in the calibrator).

At the second step 502, in 2.2, the user must now provide his/her mobile user credentials, which are the CMS user ID and the corresponding mobile password. If the password is entered incorrectly too many times (this is a setting in the CMS in one embodiment), the user account is locked.

At the third step 503, in 2.3, a list of instruments sent to the mobile device is now available in the mobile device. The user selects one instrument from the list to start a calibration or checklist execution.

At the fourth step 504, in 2.4, the user executes the calibration or checklist tasks according to the possible instructions available either manually or in an electronic form within the calibration device or app.

At the fifth step 505, in 2.5, the following is performed. When the user is saving the result, his/her credentials are required once more by the system. This way a user is not able to pass on the mobile device to someone else, who does not have valid mobile user credentials to perform the work by him/herself. With such a configuration, a result cannot be saved without user authentication.

At the sixth step 506, in 2.6, after saving, the user has the possibility to perform another calibration for the same instrument or to select a new instrument to calibrate (or to go through a checklist). The algorithm thus deviates here to two different paths.

If a new calibration is still needed for the same instrument or for a new instrument, the method goes back to the third step 503 (2.3), and repeats the third, fourth and fifth steps (503-505).

In the final seventh step 507 of FIG. 5, in 2.7, after all work is done, the user exits the application or the documenting calibrator mode.

FIG. 6 illustrates the third high-level step of FIG. 3, named here as "Receive results to CMS (online)".

In the first step 601 of FIG. 6, in 3.1, the user provides his/her CMS user ID and his/her CMS password. When valid credentials are provided, the user is allowed to access the CMS.

In the second step 602, in 3.2, the user connects a supported mobile device to the CMS. The connection can be via a USB cable or via network connection depending on the product.

In the third step 603, in 3.3, the user selects the results to be received to the master system, i.e. to the CMS.

In the fourth step 604, in 3.4, the user can disconnect the mobile device from the CMS.

Finally, in the fifth and final step 605, in 3.5, the user signs out from the CMS system.

Of course, the presented flow charts in FIGS. 4-6 are merely examples and some added steps can be implemented without departing from the inventive idea of the present invention.

Generally speaking regarding the presented method, the CMS user and the mobile device user can either be the same person but they can also be different persons. In the latter case, the CMS user may be a supervisor (i.e. the boss) who loads the desired work from the CMS to a mobile device, and thereafter, a subordinate for the supervisor performs the actual work in the field. Additionally, the work results can be received in the CMS by anyone who has a right to receive the work results in the CMS from a mobile device used in the field.

The algorithm steps in the devices and between the devices can be in practice implemented with computer software, i.e. by at least one computer program which can be executed in a controller, processor, CPU, external server or cloud computing server. In this particular case, the CMS has a central processor and a memory for executing its algorithm steps, and the mobile device has its own processor unit for running the offline steps within the mobile device. Regarding data transfer steps, the relevant steps can be implemented with a computer program stored in either of these elements.

The different aspects of the present invention thus comprise a method, a system and a computer program for user authentication in an offline calibration or checklist performing device.

The present invention is not restricted merely to the embodiments disclosed above but the present invention may vary within the scope of the claims.

The invention claimed is:
1. A method for user authentication in an offline mobile device, which is either a calibrator or a smart phone/tablet with a mobile application, used to document calibration and checklist execution tasks, wherein the method comprises the steps of:

setting the mobile device into an online state that allows data to transfer with a Calibration Management Software (CMS) server, wherein the calibration is turned on and connected with the CMD server or a mobile application is launched and set to a communicating state when internet connection is available;

assigning a task in the CMS server where the assigning is performed by a first user logged validly in the CMS server;

selecting and sending data relevant to the assigned task from the CMS server to the mobile device in online state; wherein the data relevant to the assigned task comprises selected instruments and instructions for the selected instruments, a list of references when needed, and a list of mobile users together with their encrypted mobile passwords;

requesting mobile user credentials from a second user in the field with the mobile device in an offline state before the assigned task can be seen or selected;

performing the assigned task with the mobile device in the offline state in the field;

saving the results to the mobile device in the offline state, where with each result save, mobile user credentials are requested from the second user, setting the mobile device into the online state to allow data transfer with the CMS server, wherein the calibrator is tuned on and connected with the CMS server or the mobile application is launched and set to a communicating state when internet connection is available; and transferring the results of a completed task from the mobile device to the CMS server.

2. The method according to claim 1, wherein the assigned task comprises one or more calibration or checklist performing sub-tasks.

3. The method according to claim 1, wherein the mobile calibration or checklist performing device is a dedicated field calibrator, or a smart device comprising a suitable application.

4. The method according to claim 1, wherein the first user and the second user are the same user performing the field calibration task or checklist performing task.

5. The method according to claim 1, wherein all authorized field user IDs and passwords are stored in the CMS server.

6. The method according to claim 1, wherein an auxiliary group of supervising users is defined in the CMS server, which is given a special permission for all or part of the information in the mobile calibration or checklist performing device in offline state.

7. The method according to claim 1, wherein the calibration or checklist performing task is performed in the field with no network connection possibilities during the performance of the task.

8. A system for user authentication in an offline device, which is either a calibrator or a smart phone/tablet with a mobile application, used to document calibration and checklist execution tasks, wherein the system comprises a controller configured to set the mobile device into an online state that allows data transfer with a Calibration Management Software (CMS) server, wherein the calibrator is turned on and connected with the CMS server or the mobile application is launched and set to a communicating state when an internet connection is available;

assign a task in the CMS server where the assigning is performed by a first user validly logged into the CMS server;

select and send data relevant to the assigned task from the CMS server to the mobile device while in an online state, wherein the data relevant to the assigned task comprises selected instruments and instructions for the selected instruments, a list of references when needed, and a list of mobile users together with their encrypted mobile passwords;

request mobile user credentials from a second user in the field with the mobile device in an offline state before the assignment task can be seen or selected;

perform the assigned task with the mobile device while in the offline state in the field;

save the results to the mobile device while in the offline state, where with each result saved, mobile user credentials are requested from the second user, set the mobile device in the online state to allow data transfer with the CMS server, wherein the calibrator is turned on and connected with the CMS server or the mobile application is launched and set to a communicating state when an internet connection is available; and transfer the results of a compared task from the mobile device to the CMS server.

9. The system according to claim 8, wherein the assigned task comprises one or more calibration or checklist performing sub-tasks.

10. The system according to claim 8, wherein the mobile calibration or checklist performing device is a dedicated field calibrator, or a smart device comprising a suitable application.

11. The system according to claim 8, wherein the first user and the second user are the same user performing the field calibration task or checklist performing task.

12. The system according to claim 8, wherein all authorized field user IDs and passwords are stored in the CMS server.

13. The system according to claim 8, wherein an auxiliary group of supervising users is defined in the CMS server, which is given a special permission for all or part of the information in the mobile calibration or checklist performing device in offline state.

* * * * *